United States Patent [19]

Legros et al.

[11] Patent Number: 5,194,541
[45] Date of Patent: Mar. 16, 1993

[54] ACRYLIC COPOLYMERS AND THEIR APPLICATION TO THE COATING OF BITUMINOUS MATERIALS

[75] Inventors: Robert Legros, Cinqueux; Bernard Wiegert, Bernouville; Claude Tripette, Nogent S/Oise, all of France

[73] Assignee: Societe Anonyme Dite Norsolor, Paris la Defense, France

[21] Appl. No.: 675,927

[22] PCT Filed: Jul. 3, 1990

[86] PCT No.: PCT/FR90/00504
§ 371 Date: May 6, 1991
§ 102(e) Date: May 6, 1991

[87] PCT Pub. No.: WO91/00881
PCT Pub. Date: Jan. 24, 1991

[30] Foreign Application Priority Data

Jul. 6, 1989 [FR] France .................. 89 09141
Apr. 9, 1990 [FR] France .................. 90 04505

[51] Int. Cl.⁵ .............. C08F 220/22; C08F 222/06; C08F 220/18; C08F 8/00
[52] U.S. Cl. .............. 526/245; 526/246; 526/271; 526/328; 526/320; 525/193
[58] Field of Search ...................... 526/245

[56] References Cited

U.S. PATENT DOCUMENTS 3,920,614 11/1975 Kirimoto et al. .............. 526/245
5,032,658 7/1991 Baron et al. .............. 526/321

FOREIGN PATENT DOCUMENTS 530687 7/1983 Australia .
0091021 3/1983 European Pat. Off. .
0152889 2/1985 European Pat. Off. .
2539393 3/1976 Fed. Rep. of Germany .

Primary Examiner—Joseph L. Schofer
Assistant Examiner—Wu C. Cheng
Attorney, Agent, or Firm—Millen, White, Zelano and Branigan

[57] ABSTRACT

Acrylic copolymer comprising, per 100 parts by weight:
approximately from 2 to 65 parts by weight of at least one polyoxyether (meth)acrylate of formula:

$$H_2C=C-C-O-(CH_2)_m-O-(CH_2)_n-OR_2 \quad (I)$$
$$\phantom{H_2C=}{\underset{R_1}{|}}\phantom{-C}{\underset{O}{\|}}$$

in which:
$R_1$ is a methyl radical or a hydrogen atom,
$R_2$ is a hydrocarbon radical containing from 1 to 18 carbon atoms,
$1 \leq m \leq 20$ and $1 \leq n \leq 20$,
from 1 to 6 parts by weight of (meth)acrylic anhydride,
from 0 to 65 parts by weight of at least one fluoroalkyl (meth)acrylate, and
from 0 to 97 parts by weight of at least one alkoxyalkyl (meth)acrylate.

Process for coating a bituminous material, according to which the said material is coated with a formulation comprising an aqueous dispersion of a copolymer such as defined above.

17 Claims, No Drawings

ACRYLIC COPOLYMERS AND THEIR APPLICATION TO THE COATING OF BITUMINOUS MATERIALS

BACKGROUND OF THE INVENTION

The present invention relates to new acrylic copolymers which can be used for coating bituminous materials.

Bituminous materials are well known as sealing products in the building and civil engineering industry, in which they are employed especially for sealing mineral surfaces and metal components subjected to moisture, such as terraces, pipelines and offshore structures. They are also well known in the public works industry in the form of asphalt mixes which are spread on roads, roadways, runways and the like. A well-known disadvantage of bituminous materials in these various applications consists of the difficulty in coating them with a paint or with a coating capable of preventing them from degrading under the action of solar radiation and of modifying their aesthetic appearance, and in particular one capable of replacing their black color with a lighter color of the user's choice. In many fields of architecture and in particular in the decoration of buildings this disadvantage has resulted in bituminous materials being replaced with other sealing products which are more costly but whose aesthetic appearance can be modified without difficulty. In the field of public works a well-known application of the painting of bituminous materials consists of the marking coatings for protected pedestrian passages placed across roadways. In this application the difficulties of adhesion of the paint to the bituminous material, especially with the combined action of inclement weather and of vehicular traffic, result in the very frequent necessity of reapplication of these marking coatings.

SUMMARY OF THE INVENTION

The objective set by the present invention consequently consists in offering a new coating of bituminous material, itself capable of being coated with a finish coat capable of adhering durably to the said bituminous material (even under the prolonged action of inclement weather) and capable of substantially avoiding the yellowing of the finish coat due to the outward migration or exudation of the polyaromatic compounds and/or flux oils (chrysene) from the bituminous material.

In order to solve the problem which thus arises, a first subject of the present invention consists therefore of new acrylic copolymers comprising, per 100 parts by weight:

approximately from 2 to 65 parts by weight of at least one polyoxyether acrylate or methacrylate of formula:

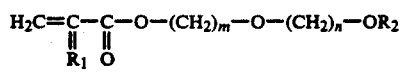

in which:
$R_1$ is a methyl radical or a hydrogen atom,
$R_2$ is a hydrocarbon radical containing from 1 to 18 carbon atoms,
$1 \leq m \leq 20$ and $1 \leq n \leq 20$, approximately from 1 to 6 parts by weight of acrylic or methacrylic anhydride, approximately from 0 to 65 parts by weight of at least one fluoroalkyl acrylate or methacrylate, and approximately from 0 to 97 parts by weight of at least one alkoxyalkyl acrylate or methacrylate.

Ethyl diglycol acrylate may be mentioned especially as a polyoxyether (meth)acrylate.

A fluoroalkyl (meth)acrylate within the meaning of the present invention means preferably a compound of formula:

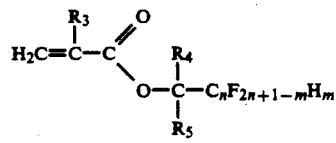

in which:
$R_3$ is a methyl radical or a hydrogen atom,
$R_4$ and $R_5$, which are identical or different, are chosen from H, $CH_3$, $CH_2$—$CH_3$ and $CF_3$,
n is between 1 and 20, and
m is between 0 and n.

2,2,2-Trifluoroethyl methacrylate may be mentioned as an example of such a compound.

Alkoxyalkyl (meth)acrylate within the meaning of the present invention means preferably the compounds of formula:

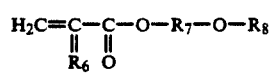

in which:
$R_6$ is a methyl radical or a hydrogen atom, and
$R_7$ and $R_8$, which are identical or different, are linear or branched alkyl radicals containing from 1 to 6 carbon atoms.

As examples of such compounds there may be mentioned methoxymethyl, ethoxyethyl, ethoxymethyl, methoxyethyl, isopropoxymethyl and isopropoxyethyl acrylate and methacrylate.

It is important that the polyoxyether (meth)acrylates present in the copolymers according to the invention should not be confused with alkylene glycol (meth)acrylates which end in a hydroxyl functional group, since the latter do not offer the advantages expected as a function of the objective of the present invention.

The copolymers according to the invention can be in the form of an aqueous dispersion, it being possible for the solids content (concentration of solid matter) of the said dispersion to be up to approximately 70% by weight. The particle size of the aqueous dispersion (determined by turbidimetry) may be approximately between 0.05 and 0.5 μm. The Brookfield viscosity at 20° C. of an aqueous copolymer dispersion according to the invention may be generally between 30 and 300 mPa s.

The acrylic copolymers according to the invention may additionally comprise, per 100 parts by weight, up to approximately 5 parts of acrylic acid and/or up to approximately 3 parts of at least one crosslinking monomer chosen preferably from the N-hydroxyalkylamides of acrylic and methacrylic acids, acrylamide, methacrylamide, divinylbenzene and polyol oligoacrylates and oligomethacrylates such as especially triethylene glycol di(meth)acrylate, ethylene glycol dimethacrylate, tetraethylene glycol di(meth)acrylate, polyethylene glycol 200 di(meth)acrylate, 1,6-hexanediol di(meth)acrylate, neopentyl glycol di(meth)acrylate, 1,3butylene glycol di(meth)acrylate, diethylene glycol di(meth)acrylate, trimethylolpropane tri(meth)acrylate, ethoxylated bisphenol A di(meth)acrylate, pentaerythritol tetraacrylate, tripropylene glycol diacrylate, dipentaerythritol hydroxypentaacrylate, trihydroxyethyl isocyanurate triacrylate and ethoxylated trimethylolpropane triacrylate.

A second subject of the present invention concerns a process for the manufacture of a copolymer such as described above, comprising the polymerization of monomers in emulsion in water, characterized in that the mixture of monomers to be polymerized comprises, per 100 parts by weight:

- approximately from 2 to 65 parts by weight of at least one polyoxyether acrylate or methacrylate of formula (I),
- approximately from 1 to 6 parts by weight of acrylic or methacrylic anhydride,
- approximately from 0 to 65 parts by weight of at least one fluoroalkyl acrylate or methacrylate, and
- approximately from 0 to 97 parts by weight of at least one alkoxyalkyl acrylate or methacrylate,
- from 0 to 5 parts of acrylic acid, and
- from 0 to 3 parts of at least one crosslinking monomer such as described above.

The polymerization is generally performed at a temperature of approximately between 55° C. and 90° C., in the presence of at least one initiator capable of generating free radicals, for a period of approximately from 2 to 8 hours.

The polymerization initiator may be chosen especially from persulfates, peroxides, hydroperoxides and diazo compounds; when an alkali metal persulfate is chosen, it may be employed in combination with a reducing agent chosen from polyhydroxphenols, sodium sulfite and bisulphite, dimethylaminopropionitrile, diazomercaptans and ferricyanides. The initiator and, where appropriate, the reducing agent can be employed in a proportion of 0.1 to 2% of each by weight in the relation to the combined monomers present.

As is known, the process according to the invention can take place in the presence of at least one anionic, cationic or nonionic dispersing agent, from 0.5 to 10% by weight of which is usually employed in relation to the combined monomers present. Examples of dispersing agents which can be employed when a polymerization process according to the present invention is implemented and which may be mentioned in particular are alkali metal and ammonium salts of alkyl-, aryl-, alkaryl- and aralkylsulfonates and sulphates or polyethersulphates, the corresponding phosphates and phosphonates, and ethoxylated fatty acids, esters, alcohols, amines, amides and alkylphenols.

It may also be advantageous to perform the polymerization in the presence of 0.1 to 0.5 parts of a buffer such as sodium bicarbonate.

As is well known in this field of technology, the pH of the aqueous dispersion obtained by the process according to the invention can be adjusted to the desired value by the addition of alkali or amine. If desired, the copolymer according to the invention can be isolated from the aqueous dispersion containing it by the well-known techniques of flocculation, deep freezing and spraying.

Finally, a third subject of the present invention consists of a process for coating a bituminous material, characterized in that the said material is coated with a formulation comprising an aqueous dispersion of an acrylic copolymer such as defined above before, if appropriate, the application of a layer of finishing paint. According to a preferred embodiment of the coating process according to the invention, a formulation comprising from 40 to 75% by weight of the aqueous dispersion according to the invention is applied onto the bituminous material.

This formulation generally additionally comprises:
- at least one diluent which may be water, and/or
- at least one thickener such as a cellulose derivative (especially hydroxyethyl cellulose), an ethoxylated polyurethane or a polyacrylate, and/or
- at least one dispersant such as a sodium polyacrylate, polymaleate or hexametaphosphate, and/or at least one biocidal agent, and/or
- at least one lamellar filler such as silicate, alumina, mica, kaolin, talc, silica, graphite, slate powder and/or
- at least one coalescing agent such as butyl diglycol and/or
- at least one pigment such as aluminum, iron oxide or titanium oxide paste, and/or
- at least one antifoaming agent.

The finish coat which is applied, where appropriate, onto the formulation based on an aqueous dispersion of acrylic copolymer according to the invention consists of a decorative coating of the same kind as those which can be usually applied to an intermediate coating layer of acrylic type, for example a glycerophthalic paint.

The chief advantage of the coating process according to the invention consists in the fact that the intermediate coating layer obtained from the aqueous dispersion defined above adheres durably to the bituminous material, even under the prolonged action of inclement weather, and forms an effective barrier against the migration and exudation of the polyaromatic compounds and/or flux oils (chrysene) from the bituminous material towards the finish coat, thus preventing the latter from yellowing prematurely.

The examples below are given by way of illustration and without limiting the present invention.

EXAMPLES 1 to 4

A mixture of 2,2,2-trifluoroethyl methacrylate (TRIFEMA), ethyl diglycol acrylate (EDGA), methacrylic anhydride (MAA), ethoxyethyl methacrylate (EEMA), acrylic acid (AA) and N-methylolacrylamide (NMA) in emulsion in 150 parts of water is polymerized batchwise in a 5-liter reactor, in the presence of 0.35 parts of ammonium persulfate and 0.35 parts of sodium metabisulfite as initiators and in the presence of 3 parts of sodium nonylphenyl sulfate containing 25 moles of ethylene oxide as surface-active agent. The polymerization is carried out at 68° C. for 4 hours. An aqueous dispersion with a solids content of 40% by weight is thus obtained, whose particles have a mean size d, measured by turbidimetry and expressed in microns, which is shown in the table below. The quantities of the various acrylic monomers are also shown, expressed in parts by weight, in the same table, together with the minimum film-forming temperature MFT, expressed in degrees Celsius and defined as being the temperature below which it is not possible to form a coherent and adherent film without involving the use of a coalescing agent.

TABLE 1

| Example | 1 | 2 | 3 | 4 |
| --- | --- | --- | --- | --- |
| EDGA | 4 | 10.5 | 9 | 15.5 |
| TRIFEMA | 5 | 10 | 5 | 10 |
| MAA | 4 | 4 | 4 | 4 |
| EEMA | 85 | 73.5 | 80 | 68.5 |
| AA | 1 | 1 | 1 | 1 |
| NMA | 1 | 1 | 1 | 1 |
| d | 0.14 | 0.10 | 0.10 | 0.11 |
| MFT | +10 | +1 | +3 | +3 |

Formulations containing the following, per 1,000 parts by weight, are then prepared:
476 parts by weight of an aqueous dispersion obtained in accordance with the above operating method,
152 parts of water,
2 parts of a cellulose ether gel marketed by Hoechst under the name TYLOSE H 20,
2 parts of 22% strength ammonia,
2 parts of polyacrylate dispersant marketed by the Société d'Exploitation des Procédés Coatex under the name COATEX P 890,
2 parts of a biocidal agent marketed by UNION CARBIDE under the name PIROR P 840,
2 parts of an antifoaming agent marketed by HENKEL under the name NOPCO NDW,
200 parts of an alumina silicate marketed by the Comptoir de Minéraux et Matiéres Premiéres under the name MICROMICA MU 2/1,
5 parts of butyldiglycol (coalescing agent),
8 parts of an ethoxylated polyurethane marketed by ROHM & HAAS under the name PRIMAL QR 1001, and
150 parts of Supreme kaolin marketed by ENGLISH CHINA CLAY.

The formulations thus prepared are characterized by their pH at 20° C. and the following viscosities, measured at 20° C. and expressed in mPa s:
25 Brookfield viscosity at 50 revolutions/min. ($B_{50}$)
Brookfield viscosity at 5 revolutions/min. ($B_5$)
viscosity $\eta$ at $10^4 s^{-1}$.

Onto a sandblasted steel panel 7.5×15 cm in size are applied in succession two coats of an epoxy tar marketed by COFIDEP under the trademark Freitabrai, at a rate of 100 g/m² per coat, then two coats of the intermediate coating consisting of the above formulation, at a rate of 100 g/m² per coat, and finally two coats of a glycerophthalic finishing paint marketed by COFIDEP under the trademark Ripolin 500 SL, at a rate of 100 g/m² per coat.

The characteristics of the formulations are shown in Table II below.

The evaluation of the resistance to the migration of the polyaromatic compounds and/or flux oils from the epoxy tar is carried out after 40 days by measuring the colorimetric indicator L the value of which is shown in Table II below. L is the trichromatic coordinate of the Hunter Lab system $= 10\sqrt{Y}$, Y being the luminous luminance factor of the color reference system defined by the International Commission on Illumination, with L=0 (black) and L=100 (white).

TABLE II

| Example | 1 | 2 | 3 | 4 |
| --- | --- | --- | --- | --- |
| pH | 7.5 | 7.3 | 7.3 | 7.7 |
| $B_{50}$ | 76 | 66 | 86 | 42 |
| $B_5$ | 16.8 | 15.6 | 19.2 | 12 |
| $\eta$ | 0.5 | 0.5 | 0.55 | 0.55 |
| L | 93.6 | 92.6 | 92.7 | 91.2 |

EXAMPLE 5

A mixture of 47.5 parts of 2,2,2-trifluoroethyl methacrylate, 47.5 parts of ethyldiglycol acrylate, 4 parts of methacrylic anhydride and 1 part of N-methylolacrylamide in emulsion in 150 parts of water is polymerized batchwise in a 5-liter reactor, in the presence of 0.35 parts of ammonium persulfate and 0.35 parts of sodium metabisulfite as initiators and in the presence of 3 parts of sodium nonylphenyl sulfate containing 25 moles of ethylene oxide as surface-active agent. The polymerization is carried out at 68° C. for 4 hours. An aqueous dispersion with a solids content of 39% by weight is thus obtained, whose particles have a mean size, measured by turbidimetry of 0.10 µm. This dispersion can be additionally characterized by
a glass transition temperature equal to −3° C.,
a Brookfield viscosity at 20° C. of 40 mPa s after neutralization to pH 9.

A formulation is then prepared, comprising, per 1,000 parts by weight:
576 parts of the aqueous dispersion obtained above,
135 parts of water,
4 parts of hydroxyethyl cellulose,
2 parts of aminomethylpropanol neutralizing agent),
4 parts of polyacrylate marketed under the name Coatex P 890,
2 parts of a biocidal agent marketed under the name Piror P 840,
2 parts of an antifoaming agent marketed under the name Nopco NDW,
200 parts of an alumina silicate marketed under the name Micromica MU 2/1,
5 parts of butyldiglycol, 20 parts of an ethoxylated polyurethane marketed under the name Primal QR 1001, and
50 parts of aluminum paste.

Onto a sandblasted steel panel 7.5×15 cm in size are applied in succession two coats of an epoxy tar marketed by COFIDEP under the trademark Freitabrai, at a rate of 100 g/m² per coat, then two coats of the intermediate coating consisting of the above formulation, at a rate of 100 g/m² per coat, and finally two coats of a glycerophthalic finishing paint marketed by COFIDEP under the trademark Ripolin 500 SL, at a rate of 100 g/m² per coat.

After 4 months' exposure at room temperature it may be considered that the tint of the finishing paint has remained stationary. In fact, the yellowing index measured by colorimetry is equal to 19. By way of comparison, the yellowing index of the finishing paint in the total absence of intermediate coating is equal to 61 under the same conditions of exposure.

We claim:
1. An acrylic copolymer comprising, per 100 parts by weight:
(A) from 2 to 65 parts by weight of at least one polyoxyether acrylate or methacrylate of the formula:

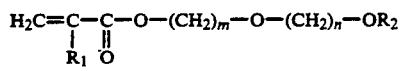

wherein:
R₁ is methyl or a hydrogen atom,
R₂ is a hydrocarbon radical containing from 1 to 18 carbon atoms,
$1 \leq m \leq 20$ and $1 \leq n \leq 20$, (B) from 1 to 6 parts by weight of methacrylic anhydride, (C) from above 0 to 65 parts by weight of at least one fluoroalkyl (meth)acrylate, and (D) from above 0 to 97 parts by weight of at least one alkoxyalky (meth)acrylate.

2. A copolymer according to claim 1, additionally comprising not more than 5 parts of acrylic acid per 100 parts by weight.

3. A copolymer according to claim 1, additionally comprising not more than 3 parts of at least one crosslinking monomer per 100 parts by weight.

4. A copolymer according to claim 1, wherein the fluoroalkyl acrylate is a compound of formula:

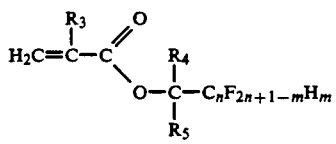

in which:
R₃ is a methyl radical or a hydrogen atom,
R₄ and R₅, which are identical or different, are H, CH₃, CH₂—CH₃ or CF₃,
n is between 1 and 20, and
m is between 0 and n.

5. A copolymer according to claim 1, in the form of an aqueous dispersion.

6. A copolymer according to claim 5, wherein the particle size of the dispersion is between 0.05 and 0.5 μm.

7. A copolymer according to claim 5, having a Brookfield viscosity at 20° C. of between 30 and 300 mPa s.

8. A process for the manufacture of a copolymer according to claim 1, comprising the polymerization of monomers in an aqueous emulsion, wherein the mixture of monomers to be polymerized comprises, per 100 parts by weight:

(A) from 2 to 65 parts by weight of at least one polyoxyether acrylate or methacrylate of formula (I), (B) from 1 to 6 parts by weight of acrylic or methacrylic anhydride, (C) from above 0 to 65 parts by weight of at least one fluoroalkyl acrylate or methacrylate, (D) from above 0 to 97 parts by weight of at least one alkoxyalkyl acrylate or methacrylate, (E) from above 0 to 5 parts by acrylic acid, and (F) from above 0 to 3 parts of at least one crosslinking monomer.

9. A process for coating a bituminous material, said material being coated with a formulation comprising an aqueous dispersion of a copolymer in accordance with one of claims 1 to 4.

10. A coating process according to claim 9, wherein said formulation additionally comprises at least one diluent and/or thickener and/or dispersant and/or biocidal agent and/or lamellar filler and/or coalescing agent and/or pigment and/or antifoaming agent.

11. A product produced in accordance with the process of claim 9.

12. A copolymer according to claim 3, wherein said crosslinking monomer comprises at least one of an N-hydroxyalkyl amide of acrylic or methacrylic acid, acrylamide, methacrylamide, divinylbenzene, a polyol oligoacrylate, or a polyol oligomethacrylate.

13. A copolymer according to claim 3, wherein said crosslinking agent comprises at least one of triethylene glycol di(meth)acrylate, ethylene glycol dimethacrylate, tetraethylene glycol di(meth)acrylate, polyethylene glycol 200 di(meth)acrylate, 1,6-hexanediol di(meth)acrylate, neopentyl glycol di(meth)acrylate, 1,3-butylene glycol di(meth)acrylate, diethylene glycol di(meth)acrylate, trimethylolpropane tri(meth)acrylate, ethoxylated bisphenol A di(meth)acrylate, pentaerythritol tetraacrylate, tripropylene glycol diacrylate, dipentaerythritol hydroxypentaacrylate, trihydroxyethyl isocyanurate triacrylate or ethoxylated trimethylolpropane triacrylate.

14. A copolymer according to claim 1, wherein said acrylic polymer consists essentially of (A), (B), (C) and (D).

15. An acrylic copolymer according to claim 2, consisting essentially of (A), (B), (C) and (D) and acrylic acid.

16. An acrylic copolymer according to claim 3, consisting essentially of (A), (B), (C) and (D) and said at least one crosslinking monomer.

17. An acrylic copolymer according to claim 1, consisting essentially of per 100 parts by weight (A), (B), (C) and (D), not more than 5 parts of acrylic acid, and not more than 3 parts of at least one crosslinking monomer.

* * * * *